United States Patent
Rastgar (10) Patent No.: US 10,839,531 B2
(45) Date of Patent: Nov. 17, 2020

(54) OBJECT TRACKING BASED ON A USER-SPECIFIED INITIALIZATION POINT

(71) Applicant: SONY CORPORATION, Tokyo (JP)

(72) Inventor: Houman Rastgar, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 158 days.

(21) Appl. No.: 16/191,884

(22) Filed: Nov. 15, 2018

(65) Prior Publication Data

US 2020/0160540 A1     May 21, 2020

(51) Int. Cl.
*G06K 9/00*     (2006.01)
*G06T 7/246*    (2017.01)

(52) U.S. Cl.
CPC .................................. *G06T 7/251* (2017.01)

(58) Field of Classification Search
CPC ..................... G06T 7/251; G06T 2207/20101; G06T 7/246
See application file for complete search history.

(56) References Cited

U.S. PATENT DOCUMENTS

| | | | |
|---|---|---|---|
| 8,374,388 B2 | 2/2013 | Stolkin et al. | |
| 8,660,302 B2 * | 2/2014 | Woo | G06K 9/00 348/169 |
| 9,147,261 B2 | 9/2015 | Dogra et al. | |
| 9,269,012 B2 | 2/2016 | Fotland | |
| 9,277,129 B2 * | 3/2016 | Klivington | H04N 5/23267 |
| 2014/0169663 A1 | 6/2014 | Han et al. | |
| 2014/0241576 A1 * | 8/2014 | Yu | G06T 7/55 382/103 |

(Continued)

FOREIGN PATENT DOCUMENTS

| | | |
|---|---|---|
| EP | 3029631 A1 | 6/2016 |
| KR | 10-2014-0061266 A | 5/2014 |

(Continued)

OTHER PUBLICATIONS

Peter C. Niedfeldt, "Recursive-RANSAC: A Novel Algorithm for Tracking Multiple Targets in Clutter", BYU Scholars Archive, XP055647217, All Theses and Dissertations, Jul. 2, 2014, 194 pages.

(Continued)

*Primary Examiner* — Phuoc Tran
(74) *Attorney, Agent, or Firm* — Chip Law Group (57) ABSTRACT

An electronic device for object tracking based on a user-specified initialization point is provided. The electronic device stores a sequence of image frames, which includes a first image frame and a second image frame. The electronic device estimates a set of feature correspondences between a first set of features points in the first image frame and a second set of feature points in the second image frame. The electronic device generates different first motion-estimate models for different groups of feature correspondences of the set of feature correspondences and further estimates, from different groups of feature correspondences, a plurality of inlier feature correspondences that correspond to the object of interest in the first image frame and the second image frame. The electronic device generates a second motion-estimate model as an optimal motion-estimate model and tracks the object of interest in the sequence of frames, based on the second motion-estimate model.

20 Claims, 6 Drawing Sheets

(56) References Cited

U.S. PATENT DOCUMENTS

2014/0362240 A1 12/2014 Klivington et al.
2017/0126977 A1 5/2017 Klivington et al.

FOREIGN PATENT DOCUMENTS

| TW | 201631553 A | 9/2016 |
| WO | 2014/094627 A1 | 6/2014 |
| WO | 2015/026902 A1 | 2/2015 |
| WO | 2016/087633 A1 | 6/2016 |

OTHER PUBLICATIONS

Xie, et al, "ORB Tracking via Random Model and Sample Consensus", XP032336277, 5th International Congress on Image and Signal Processing (CISP 2012), Feb. 25, 2013, pp. 113-117.

Yilmaz, et al., "Object Tracking: A Survey", ACM Computing Surveys, XP058090583, vol. 38, No. 4, Article 13, Dec. 2006, 46 pages.

International Search Report and Written Opinion of PCT Application No. PCT/IB2019/057834, dated Dec. 20, 2019, 16 pages of ISRWO.

* cited by examiner

OBJECT TRACKING BASED ON A USER-SPECIFIED INITIALIZATION POINT

CROSS-REFERENCE TO RELATED APPLICATIONS/INCORPORATION BY REFERENCE

None.

FIELD

Various embodiments of the disclosure relate to image processing technologies. More specifically, various embodiments of the disclosure relate to an electronic device for object tracking based on a user-specified initialization point.

BACKGROUND

Recent advancements in the field of digital image processing have led to development of various methods and techniques for tracking objects in videos. In conventional object tracking systems, a user input may be required as an initialization parameter to select an object of interest that may be tracked through a sequence of frames. For example, the user input may correspond to a selection of a patch that represents the object of interest. In order to provide the user input, the user may have to generate an entire bounding box that encloses the object of interest. The manual initialization may be performed on a first frame and enclosed image pixels may be used to train a target model, which may be then used to search for an optimal object location in subsequent frames. However, in many real-life applications, such as movie editing or surveillance, a user may not have the ability to produce a full bounding box of the object of interest as it may be laborious and cumbersome or impractical for the user to manually produce the rectangular bounding box around the object of interest, especially if the object of interest is a fast moving object, such as a vehicle. Also, in some cases, the full bounding box of the object of interest may not be visible and therefore, creation of the full bounding box may not be a feasible solution to initialize object tracking systems and may further cause inconvenience to the user.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and a method for object tracking based on a user-specified initialization point, is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed electronic device and method for object tracking based on a user-specified initialization point. Exemplary aspects of the disclosure provide an electronic device that may act as a device for real time or near-real time tracking of objects in a sequence of image frames of a live video feed or a pre-recorded video. The disclosed electronic device provides a solution to reduce a user overhead to fully annotate an object of interest in a scene whenever a user input is required to select and track the object of interest in the scene. The disclosed electronic device may be utilized in different applications, such autofocus applications in digital photography, surveillance of objects of interest in live or recorded video feed, video editing applications, addition of special effects to videos, and navigation of drones.

The disclosed electronic device provides a solution to dynamically find a support region of the object of interest via robust estimation in a Random Sampling and Consensus framework. The proposed robust estimation may use a robust scoring model that may emphasize a best transformation model in addition to proximity to a last known position of the object of interest in a first image frame (or a location of a user click in case of the first image frame).

The disclosed electronic device further provides a solution that removes a need for users to manually annotate the object of interest fully with a rectangular bounding box in the first image frame. Conventionally, such manual annotation posed a difficult problem for the users as it was a challenge to draw a rectangular bounding box with a mouse or other devices around the object of interest. Thus, with the disclosed electronic device, a user click at any point inside the region of the object of interest may be sufficient to initialize the tracking of the object of interest in the sequence of image frames. For the object tracking of desired object of interest, conventional solutions have a complex initialization process that leads to a delay in initialization of tracking operations. The disclosed electronic device further solves this problem and various systems that require keeping track of a moving object of interest in a video.

Figure 1:
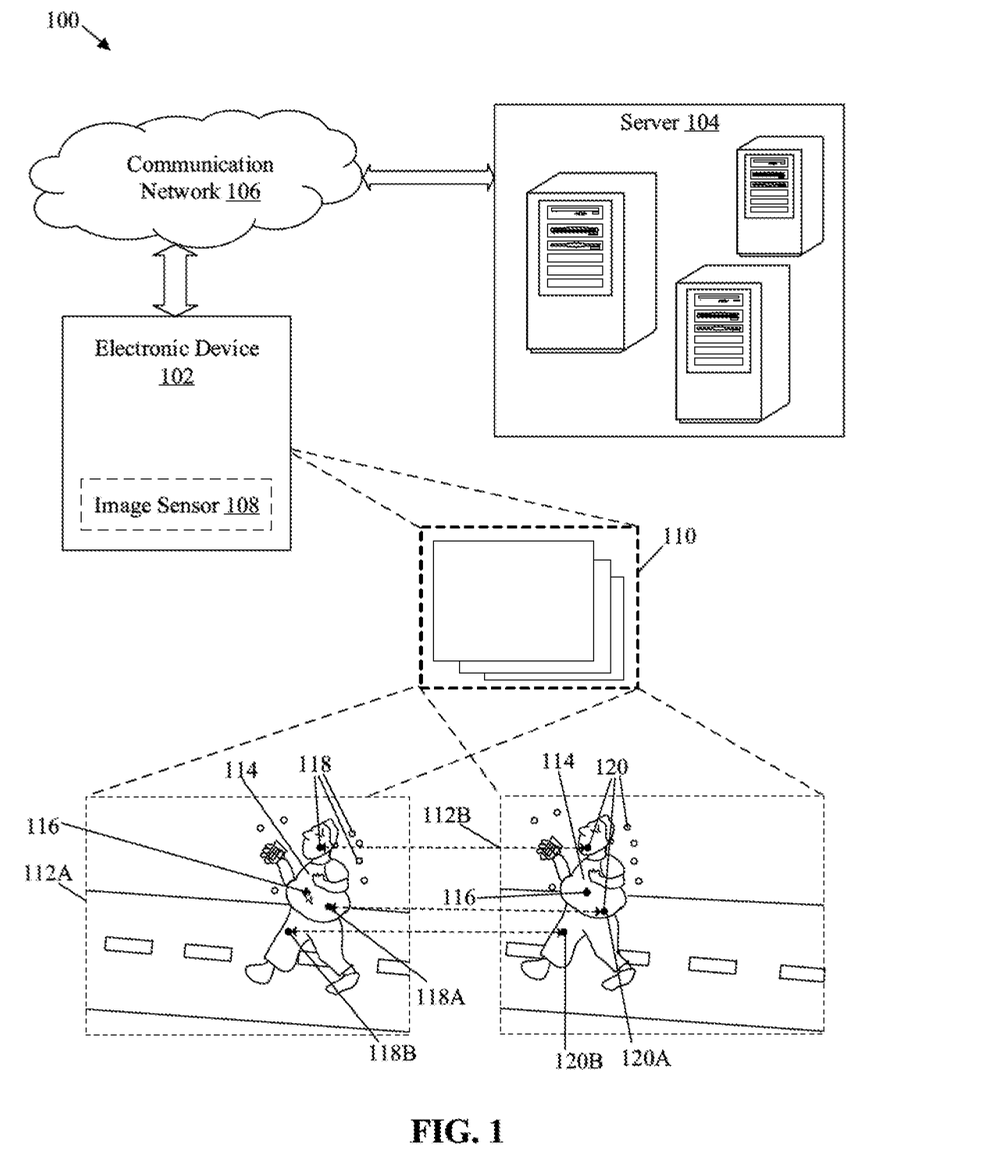
FIG. 1 is a block diagram that illustrates an exemplary environment for an electronic device that tracks an object based on a user-specified initialization point, in accordance with an embodiment of the disclosure.

FIG. 1 is a block diagram that illustrates an exemplary environment for an electronic device that tracks an object based on a user-specified initialization point, in accordance with an embodiment of the disclosure. With reference to FIG. 1, there is shown a network environment 100 that includes an electronic device 102, a server 104, and an communication network 106. In accordance with an embodiment, the electronic device 102 may be an image-capture device. In such cases, the electronic device 102 may include one or more image sensors (such as an image sensor 108), which may be configured to capture a sequence of image frames 110 of a scene within a Field-of-View (FoV) of the image sensor 108.

The electronic device 102 may comprise suitable logic, circuitry, interfaces, and/or code that may be configured to track one or more objects of interest in the sequence of image frames 110, such as successive images from videos. As an example, an object of interest 114 may be tracked in a first image frame 112A and a second image frame 112B, respectively. The electronic device 102 may be configured to initialize, based on a user-specified initialization point (e.g., an initialization point 116) in a first image frame, an object tracking operation for an object of interest in successive images frames of the sequence of image frames 110. The user-specified initialization point may correspond to a user input (e.g., a mouse click event or a screen touch event). The electronic device 102 may be further configured to manage tracking of one or more objects of interest in successive image frames of the sequence of image frames 110. Examples of the electronic device 102 may include, but are not limited to, an imaging device (such as a digital camera and a video camera), a motion-capture system, a camera phone, a projector, a computer workstation, a mainframe computer, a handheld computer, a personal computer, a laptop, a tablet, a head mounted display (HMD) device and/or a wearable device (such as, an augmented reality/virtual reality/mixed reality (AR/VR/MR) device, a server, a cellular/mobile phone, a smart appliance, a video player, a smart home monitoring device, a traffic camera, a television (e.g., smart TV), and other computing devices.

The server 104 may comprise suitable circuitry, interfaces, and/or code that may be configured to store the sequence of image frames 110 associated with a recorded or live media content and display, onto a display screen, a user interface (UI) through which the user input may be received. The user input may correspond to an initialization point associated with the object of interest in the first image frame, received from the UI displayed onto the display screen. The server 104 may be configured to communicate with the electronic device 102, via the communication network 106. Examples of the server 104 may include, but are not limited to, an application server, a cloud server, a web server, a database server, a file server, a gaming server, a mainframe server, or a combination thereof. In accordance with an embodiment, the functionalities and parts of operations executed by the electronic device 102 may be implemented at the server 104. In an alternate embodiment, the functionalities and parts of operations executed by the server 104 may be implemented at the electronic device 102.

The communication network 106 may include a medium through which the electronic device 102 may communicate with the server 104 and/or other computing components that may be omitted from the disclosure for the sake of brevity. Examples of the communication network 106 may include, but are not limited to, the Internet, a cloud network, a Long Term Evolution (LTE) network, a Wireless Local Area Network (WLAN), a Local Area Network (LAN), a telephone line (POTS), and/or a Metropolitan Area Network (MAN). Various devices in the network environment 100 may be configured to connect to the communication network 106, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, or Bluetooth (BT) communication protocols, or a combination thereof.

The image sensor 108 may comprise suitable logic, circuitry, interfaces, and/or code that may be configured to capture an image frame or the sequence of image frames 110 (e.g., a sequence of image frames from a video) of a scene in a field-of-view (FoV) of the image sensor 108. The image sensor 108 may be configured to communicate the captured sequence of image frames 110 as an input to the electronic device 102. The image sensor 108 may be implemented as an active pixel sensor, such as a complementary-metal-oxide semiconductor (CMOS) sensor. In some embodiments, instead of an active pixel sensor, the image sensor 108 may be implemented as one of a passive pixel sensor (such as a charged coupled device (CCD) sensor, an oversampled binary image sensor, a planar Fourier capture array (PFCA), a back-illuminated (BSI or BI) sensor, and the like.

Although not shown, the image sensor 108 may also include a specialized microprocessor (or a microcontroller) that may be configured to operate in accordance with image data from the image sensor 108, a graphic processing unit (GPU) to process images stored in a frame buffer, a depth sensor, and/or a memory integrated with the image sensor 108.

In operation, the electronic device 102 may be configured to retrieve the sequence of image frames 110 of a scene (or a plurality of scenes) from one or more sources, such as a local storage in memory, a storage of the image sensor 108, and the server 104. The sequence of image frames 110 may correspond to a scene (or a plurality of scenes) associated with a real environment. Alternatively, the sequence of image frames 110 may be taken from a virtual reality environment, such as an animated environment, an augmented reality environment, or a mixed reality environment.

In accordance with an embodiment, the image sensor 108 may be configured to capture the sequence of image frames 110 from the FOV of the image sensor 108. In such cases, the sequence of image frames 110 may correspond to a live video feed, such as a closed circuitry television (CCTV) footage. The live video feed (i.e., that includes the sequence of image frames 110) may include a plurality of objects (e.g., humans, animals, vehicles, etc.) that may be in motion in the FOV of the image sensor 108. As an example, the sequence of image frames 110 may include the first image frame 112A and the second image frame 112B.

In certain embodiments, the electronic device 102 may be configured to display a live preview of the captured sequence of image frames 110 on a display device, such as a smart television, a smartphone, a light emitting diode (LED screen), or a liquid crystal display (LCD) screen. The display device may further include additional components that may act as an input/output (I/O) interface, such as a gesture sensor, a touch panel for a display screen of the display device, or a smart speaker for a voice input. The display device may be integrated with the electronic device 102 or may be peripherally coupled with the electronic device 102.

The electronic device 102 may be configured to receive a first input from a user. The first input may include information associated with an object of interest, which may be in one or more image frames of the displayed live preview. The first input may be indicative of a user interest to track a position, an occupied region, or a movement of the object of interest (e.g., the object of interest 114) in the sequence of image frames 110. The first input may be received via an input device that may be embedded or peripherally coupled with the electronic device 102. In some scenarios, the input device may be an optical mouse and the first input may be a click input over to a particular point on a first image frame of the sequence of image frames 110. The particular point may be a user-specified initialization point (e.g., the initialization point 116) that may correspond to an object of interest in the sequence of image frames 110. In other scenarios, the input device may be a touchscreen on the display device or a gesture sensor that may translate gesture input from the user to a particular point on the first image frame. In such scenarios, the touch screen may be configured to receive a touch input from a particular portion of the touchscreen as the first input. The particular portion of the touchscreen may correspond to the object of interest in the first image frame, for example, the object of interest 114 in the first image frame 112A may correspond to a portion of the first image frame 112A displayed on the display device.

The electronic device 102 may be configured to select an initialization point in the first image frame based on the first input. The initialization point may be a user-specified initialization point. The electronic device 102 may be configured to identify the selected initialization point as a reference point to track the object of interest (such as, a person shown as walking on road) in the sequence of image frames 110. The initialization point (e.g., the initialization point 116) may be located in a first region of the first image frame (such as the first image frame 112A), where the first region may represent the object-of interest in the first image frame. Alternatively, the electronic device 102 may be configured to receive the user-specified initialization point at a playback time (for example, the live preview) of the sequence of image frames 110. The user-specified initialization point may correspond to a position of the object of interest in the first image frame.

The electronic device 102 may be configured to extract a first set of feature points (e.g., a first set of feature points 118) from the first image frame and a second set of feature points (e.g., the second set of feature points 120) from the second image frame. The first set of feature points and the second set of feature points may be extracted in response to a reception of the first input. In an exemplary embodiment, the first set of feature points and the second set of feature points may be Binary Robust Invariant Scalable Key-points (BRISK) extracted from the first image frame and the second image frame, respectively, based on a BRISK technique. In some embodiments, the first set of feature points and the second set of feature points may be extracted based on a feature extraction technique. Examples of different feature extraction techniques may include, but are not limited to, Harris corners, Scale Invariant Feature Transform (SIFT), Oriented Fast and Rotated-Brief (ORB), and Speeded-Up Robust Features (SURF). The details of the feature extraction technique may be known to one skilled in the art and therefore, the description has been omitted from the disclosure for the sake of brevity.

The first set of feature points and the second set of feature points may be extracted such that the first set of feature points and the second set of feature points are present within a first threshold distance and a second threshold distance, respectively, from the selected initialization point. The first threshold distance for the first image frame may be different from the second threshold distance for the second image frame. As an example, the first set of feature points and the second set of feature points may be represented as a set ($P_1$) and a set ($P_2$), respectively. The set $P_1$ and the set ($P_2$) may be given by relations (1) and (2) as follows:

$$P_1 = \{x^0 | \; \|x^0 - s\| < d_1\} = \{x_0^0, x_1^0, x_2^0, \ldots\} \quad (1)$$

$$P_2 = \{x^1 | \; \|x^1 - s\| < d_2\} = \{x_0^1, x_1^1, x_2^1, \ldots\} \quad (2)$$

Where,
$x_n^m$ represents an $n_{th}$ feature point in the mth frame of the sequence of image frames 110, e.g., m=0 represents the first image frame and m=1 represent the second image frame;

$\|.\|$ represents a norm of a vector that results from a difference of $x^0$ or $x^1$ and s;

s is a location of the initialization point 116 in the first image frame;

$d_1$ is the first threshold distance, for example, "20 percent" of width of the first image frame; and $d_2$ is the second threshold distance that is twice (or more, depending on the speed of the object) the size of $d_1$ (e.g., or "40 percent" of the width of the first image frame).

As the user-specified initialization point may only indicate a point on the object of interest, it may be insufficient to track the entire object of interest in successive image frames without a knowledge of an extent of the object of interest in successive image frames. Also, in many cases, not all the feature points in the first set of feature points or the second set of feature points may belong to the object of interest in the first image frame and the second image frame, respectively. However, some of the feature points in the first image frame may map to corresponding feature points in the second image frame. As an example, a mapping of some of the feature points from the first set of feature points 118 and the second set of feature points 120 is indicated by dotted lines.

The feature points of the first image frame may map to feature points of the second image frame based on comparison of the first set of feature points with the second set of feature points, using different feature comparison techniques, such as BRISK or SURF. As an example, feature points in the first image frame may only map to those feature points in the second image frame that reappear in the second image frame from the first image frame. Existence of a mapping for such feature points may indicate a robustness and invariance of the feature points to different effects, such as a motion, a deformation, a rotation, or a scale of the object of interest, in successive image frames of the sequence of image frames 110.

The electronic device 102 may be configured to estimate a set of feature correspondences between one or more feature points of the first set of feature points with one or more feature points of the second set of feature points. The set of feature correspondences may represent a relationship, such as a spatial relationship, a location-based relationship, a pattern-based relationship, a shape-based relationship, or a feature-based relationship, between one or more feature points of the first set of feature points and the second set of feature points. The set of feature correspondences may be estimated based on one or more computer vision techniques, such as a SIFT-based feature point extraction or a SURF-based feature point extraction. As an example, the set of feature correspondences (represented by ($L_1$)) may be a set of ordered pairs of feature points from the first set of feature points ($P_1$) and the second set of feature points ($P_2$), given in (3), as follows:

$$L_1 = \{(x_0^0, x_0^1), (x_1^0, x_1^1), (x_2^0, x_2^1), \ldots\} \quad (3)$$

For example, a first feature point 118A of the first image frame 112A may bear a correspondence to a first feature point 120A of the second image frame 112B. Similarly, the second feature point 118B of the first image frame 112A may bear a correspondence to a second feature point 120B of the second image frame 112B.

In order to identify a position of the object of interest in the second image frame or successive image frames of the sequence of image frames 110, the electronic device 102 may be configured to iteratively execute a random sampling and consensus (RANSAC) operation. The RANSAC operation may be executed on ordered pairs of feature points that belong to the estimated set of feature correspondences (such as $L_1$). In the RANSAC operation, the electronic device 102 may be further configured to select a group of feature correspondences stochastically from different groups of feature correspondences. The selected group of feature correspondences may correspond to a random sample of data points (which may be noisy) from the estimated set of feature correspondences (such as L1). The selection of the group of feature correspondences may correspond to selection of a group of feature points from the first set of feature points and the second set of feature points. Each selected group of feature correspondences from the different groups of feature correspondences may include two or more feature correspondences stochastically selected from the estimated set of feature correspondences.

With each iteration in the RANSAC operation, a similarity transformation may be applied between the group of feature points that belong to the first image frame and the second image frame, respectively. The group of feature points may correspond to the stochastically selected group of feature correspondences. The electronic device 102 may be configured to generate different first motion-estimate models for the different groups of feature correspondences. The different first motion-estimate models may be generated based on application of a similarity transformation operation on the different groups of feature points. As an example, the different first motion-estimate models may be generated by using different modelling and prediction techniques, such as linear regression, multivariate regression, or logistic regression, and thereafter, fitting a similarity transformation on the different groups of feature points. In certain scenarios, the different first motion-estimate models may be represented by different first similarity matrices generated for each group of feature correspondences of the different groups of feature correspondences.

In the RANSAC operation, the electronic device 102 may be further configured to estimate, from the different groups of feature correspondences, a plurality of inlier feature correspondences that correspond to the object of interest in the first image frame and the second image frame. The plurality of inlier feature correspondences may be estimated based on the different first motion-estimate models. The estimated plurality of inlier feature correspondences may include a set of feature points that may represent a change in a position of the object of interest in the first image frame and the second image frame. The details of the estimation of the plurality of inlier feature correspondences has been described in detail, for example, in FIGS. 2, 3A, and 3B.

The electronic device 102 may be further configured to generate a second motion-estimate model that may be an optimized motion-estimate model of the different first motion-estimate models, based on the estimated plurality of inlier feature correspondences. The second motion-estimate model may be generated by using different modelling and prediction techniques, such as linear regression, multivariate regression, or logistic regression, and thereby fitting the similarity transformation on the set of feature points that correspond to the estimated plurality of inlier feature correspondences. The optimize motion-estimate model (i.e. the second motion-estimate model) may correspond to a model based on which an accurate description of the motion of all the inlier points can be predicted in a successive image frame(s). The electronic device 102 may be further configured to track the object of interest in the sequence of frames, based on the second motion-estimate model. More specifically, using position of different inlier feature points in the first image frame, the position of inlier feature points in the second image frame may be identified by applying the second motion-estimate model to the position of inlier feature points in the first image frame. The operation of the electronic device 102 has been further described in detail, for example, in FIGS. 2, 3A, and 3B.

Figure 2:
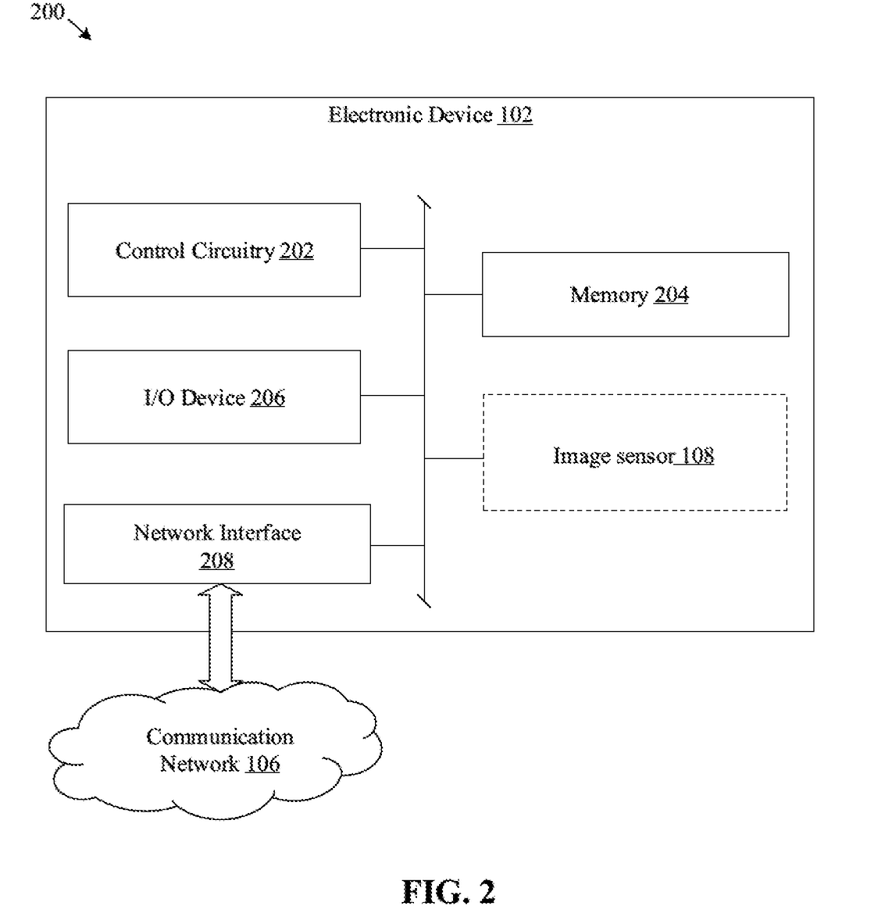
FIG. 2 is a block diagram of an exemplary electronic device for object tracking based on a user-specified initialization point, in accordance with an embodiment of the disclosure.

FIG. 2 is a block diagram of an exemplary electronic device for object tracking based on a user-specified initialization point, in accordance with an embodiment of the disclosure. FIG. 2 is explained in conjunction with elements from FIG. 1. With reference to FIG. 2, there is shown a block diagram 200 of the electronic device 102 that includes control circuitry 202. The electronic device 102 further includes a memory 204, an input/output (I/O) device 206 and a network interface 208.

The control circuitry 202 may comprise suitable logic, circuitry, interfaces, and/or code that may be configured to execute a set of instructions stored in the memory 204. The control circuitry 202 may be configured to track one or more objects of interest in the sequence of image frames, e.g., successive image frames of videos. The control circuitry 202 may be a tracker circuitry that may be configured to initialize, based on a user-specified initialization point in a first image frame, an object tracking operation for an object of interest in successive images frames of a sequence of image frames. The user-specified initialization point may correspond to a user input (e.g., a mouse click event or a screen touch event). The control circuitry 202 may be further configured to manage tracking of the one or more objects of interest in successive image frames of the sequence of image frames. Examples of implementations of the control circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a co-processor, a microcontroller, a central processing unit (CPU), and/or other control circuits.

The memory 204 may comprise suitable logic, circuitry, and/or interfaces that may be configured to store a set of instructions executable by the control circuitry 202. The memory 204 may be further configured to store the sequence of image frames captured by the image sensor 108. Examples of implementation of the memory 204 may include, but are not limited to, Random Access Memory (RAM), Read Only Memory (ROM), Hard Disk Drive (HDD), and/or a Secure Digital (SD) card.

The I/O device 206 may comprise suitable logic, circuitry, interfaces, and/or code that may be configured to receive a plurality of inputs from a user. The I/O device 206 may comprise various input and output devices that may be configured to communicate with the electronic device 102 and the server 104. Examples of the input device may include, but are not limited to, a touch screen, a keyboard, a mouse, a joystick, a microphone, and/or the image sensor 108 (FIG. 1). Examples of the output device may include, but not limited to, a display screen (such as a Liquid Crystal Display (LCD) or a Light Emitting Diode (LED) display) and/or a speaker.

The network interface 208 may comprise suitable logic, circuitry, interfaces, and/or code that may be configured to enable communication between the electronic device 102 and the server 104, via the communication network 106. The network interface 208 may implement known technologies to support wired or wireless communication with the communication network 106. The network interface 208 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 208 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the control circuitry 202 may be configured to execute the RANSAC operation (i.e. iterative random sampling) on the first set of feature points and the second set of feature points. In the RANSAC operation, the control circuitry 202 may be configured to select a group of feature correspondences stochastically from different groups of feature correspondences. The selected group of feature correspondences may correspond to a random sample of data points (which may be noisy) from the estimated set of feature correspondences (such as $L_1$). Alternatively stated, the control circuitry 202 may be further configured to select a group of feature points from the first set of feature points and the second set of feature points. The selection of the group of feature correspondences may correspond to the selection of the group of feature points from the first set of feature points and the second set of feature points. Each group of feature correspondences from the different groups of feature correspondences may include two or more feature correspondences stochastically selected from the estimated set of feature correspondences. For example, with reference to (3), different groups of feature correspondences (G) may be given by (4) as follows:

$$G=\{G_1, G_2, G_3, \ldots, G_N\}, \text{ where } G_i=\{((x_j^0, x_k^1), (x_p^0, x_q^1)\} \quad (4)$$

Where,
$G_i$ represents an $i_{th}$ group of feature correspondences from the different groups of feature correspondences (G) for i varying from 1 to N; and $(x_j, x_k)$ and $(x_p, x_q)$ represent two feature correspondences that includes a group of feature points $(x_j, x_k, x_p,$ and $x_q)$ from the first image frame and the second image frame.

In some embodiments, a number of feature correspondences may be selected for each group of feature correspondences based on a motion parameter of the object of interest. Examples of the motion parameter of the object of interest may include, but is not limited to, a translation parameter, a rotation parameter, a shear parameter, a bend parameter, a deformation parameter, or a degrees of freedom associated with the object of interest.

In the RANSAC operation, in each iteration, a similarity transformation may be applied between the group of feature points that belong to the first image frame and the second image frame, respectively. The control circuitry 202 may be configured to generate different first motion-estimate models for the different groups of feature correspondences (i.e. stochastically selected different groups of feature correspondences). More specifically, different first motion-estimate models may be generated based on application of a similarity transformation operation on the different groups of feature points. Each of the different groups of feature points may correspond to one or more of the different groups of feature correspondences. The generated different first motion-estimate models may represent a shift in positions of the second set of feature points with respect to positions of the first set of feature points.

The different first motion-estimate models may act as a similarity measure between the first set of feature points and the second set of feature points. The similarity measure of a particular feature point in the first image frame may indicate an extent to which different attributes, such as a position, a shape, or a size, of a particular feature point in the first image frame are different from a corresponding feature point in the second image frame.

In accordance with an embodiment, the different first motion-estimate models may be different similarity matrices generated by the control circuitry 202 for each stochastically selected group of feature correspondences of the different groups of feature correspondences. Thus, a first similarity matrix from the different similarity matrices may correspond to a first motion estimate model of the different motion-estimate models. Also, the first similarity matrix (represented by H) may be indicative of a similarity measure for the group of feature points corresponding to the stochastically selected group of feature correspondences.

The control circuitry 202 may be further configured to compute a score for each of the different first motion-estimate models based on application of a scoring model on a corresponding first motion-estimate model (H) and a corresponding group of feature correspondences. Alternatively stated, the score may be computed for each first similarity matrix generated for a group of feature points. As an example, the score for each of the different first motion-estimate models may be computed using the scoring model (represented by S(H, Li)), which may be given by equation (5), as follows:

$$S(H, L_1)=\Sigma\alpha\|x_i^t-Hx_i^{t-1}\|+(1-\alpha)e^{\delta\|x_j^{t-1}-s^{t-1}\|} \quad (5)$$

where,
H represents the first motion-estimate model, i.e., the generated first similarity matrix;
$L_1$ is a set of feature correspondences;
$x_i^{t-1}$ represents an $i^{th}$ feature point in the group of feature points from the first image frame (t-1$^{th}$ frame);
$x_j^t$ represents an $i^{th}$ feature point in the group of feature points from the second image frame ($t^{th}$ frame);
α is a first parameter that indicates an emphasis of error in measurement of distance between two feature points; and
δ is a second parameter that controls how fast the exponential component of the scoring model decays.

The computed score may emphasize that the group of feature points for the corresponding first motion-estimate model should appear in proximity to the user-specified initialization point and a lower error in depiction of motion of the object of interest. Thus, the computed score for each first motion-estimate model of the different first motion-estimate models may depend on the exponential component (as provided in equation (4)) that emphasizes feature points to lie near the user-specified initialization point. The computed score for each first motion-estimate model of the different first motion-estimate models may further depend on residuals of the selected group of feature points obtained based on the application of linear regression on the selected group of feature points.

The control circuitry 202 may be further configured to compute a position estimation error for each first motion-estimate model (i.e. a similarity matrix) of the different first motion-estimate models. The position estimation error for each first motion-estimate model (i.e. a similarity matrix) may correspond to a deviation of a number of pixels by which an actual position of a feature point in the first set of feature points deviates from an estimate position of the same feature point in the second set of feature points. As an example, for each similarity matrix (H), i.e. for each first motion-estimate model, the position estimation error (PE(H, $x_i^t$, $x_i^{t-1}$)) may be estimated by equations (6), as follows:

$$PE(H, x_i^t, x_i^{t-1}) = \|x_i^t - H x_i^{t-1}\| \quad (6)$$

where,
$\|.\|$ represent a norm of the $x_i^{t-1}$ and $Hx_i^{t-1}$;
$x_i^{t-1}$ represents a feature point in the first set of feature points of the first image frame (represented by t−1);
$x_i^t$ represents a feature point in the second set of feature points of the second image frame (represented by t); and
H represents a similarity matrix.

For each first motion-estimate model (i.e., each similarity matrix (H)), the control circuitry 202 may be further configured to estimate a set of inlier feature correspondences (E(H)) based on comparison of the position estimation error (PE(H, $x_i^t$, $x_i^{t-1}$)) (from equation (5)) with a pixel-based threshold (T). Thus, for each first motion-estimate model, the set of inlier feature correspondences (E(H)) may be estimated by equation (7), as follows:

$$E(H) = \{(x_i^t, x_i^{t-1}) | PE(H, x_i^t, x_i^{t-1}) < T\} \quad (7)$$

where,
T represents the pixel-based threshold in terms of number of pixels; and
PE(H, $x_i^t$, $x_i^{t-1}$) represents the position estimation error. As an example, based on equations (6) and (7), the control circuitry 202 may be configured to estimate the set of inlier feature correspondences for which the position estimation error (PE(H, $x_i^t$, $x_i^{t-1}$)) is less than a pixel-based threshold of "4" pixels.

The control circuitry 202 may be further configured to estimate, from the different groups of feature correspondences, a plurality of inlier feature correspondences that correspond to the object of interest in the first image frame and the second image frame. The control circuitry 202 may be further configured to determine a maximum of the computed score for each of the different first motion-estimate models. The estimated plurality of inlier feature correspondences may be feature correspondences in the set of inlier feature correspondences for which the computed score is the maximum. Alternatively stated, the set of inlier feature points (E) (associated with the estimated plurality of inlier feature correspondences) may be associated with one or more first motion-estimate models from the different first motion-estimate models with a maximum computed score.

The estimated plurality of inlier feature correspondences may include a set of inlier feature points (E). The set of inlier feature points (E) may represent a change in a position of the object of interest in the first image frame and the second image frame. The plurality of inlier feature correspondences may be estimated based on the different first motion-estimate models. The estimation of the plurality of inlier feature correspondences may correspond to a fitting of the different first motion-estimate models by application of linear regression on different groups of feature points that correspond to the different groups of feature correspondences.

The control circuitry 202 may be configured to generate a second motion-estimate model ($H^t$) that may be an optimized motion-estimate model of the different first motion-estimate models. The second motion-estimate model may be generated based on the estimated plurality of inlier feature correspondences. The generation of the second motion-estimate model may correspond to generation of an optimal similarity matrix based on the set of inlier feature points (E) that correspond to the estimated plurality of inlier feature correspondences. The optimal similarity matrix (corresponding to the second motion-estimate model) may correspond to a similarity matrix based on which an accurate description of the motion of all the inlier points can be predicted in a successive image frame(s). In accordance with an embodiment, the second motion-estimate model ($H^t$) may be generated by application of a regression model, such as linear regression model, on the set of inlier feature points (E) in the estimated plurality of inlier feature correspondences. The regression model may include estimation of least-squares (LS) or Normalized LS on the second motion-estimate model ($H^t$). The second motion-estimate model ($H^t$) or the re-computed similarity matrix may represent the motion of the object of interest optimally in the sequence of image frames.

As an example, for the set of inlier feature points (E), the second motion estimate model ($H^t$) or the optimal similarity matrix may be estimated based on minimum sum of a norm, such as $L^2$ Norm or Euclidean Norm, of the set of feature points (E) in the first image frame and the second image frame. The second motion estimate model ($H^t$) may be estimated by equation (8), as follows:

$$H^t = \underset{H}{\operatorname{argmin}} \sum_{\forall i; x_i \in E} \|x_i^t - Hx_i^{t-1}\| \quad (8)$$

where,
$x_i^t$ represents an inlier feature point of the second set of feature points;
$x_i^{t-1}$ represents an inlier feature point of the first set of feature points; and $\operatorname{argmin}_H$ represents an argument for which sum of a norm $\|x_i^t - H x_i^{t-1}\|$ attains a minimum value.

In accordance with an embodiment, once the second motion-estimate model ($H^t$) is estimated, the control circuitry 202 may be further configured to update positions of inlier feature points in the second set of feature points that belongs to the second image frame. The positions of inlier feature points may be updated based on the estimated second motion-estimate model ($H^t$). The updated positions of the inlier feature points of the second image frame may be given by equation (9), as follows:

$$S^t = H^{t*} S^{t-1} \quad (9)$$

where, $S^{t-1}$ is the updated position of an inlier feature point in the set of inlier feature points (E); and $S^t$ is actual position of an inlier feature point in the set of inlier feature points (E).

The control circuitry 202 may be further configured to track the object of interest in the sequence of image frames, based on the second motion-estimate model ($H^t$). In some embodiments, a path of the object of interest may be tracked in successive frames based on update of positions of the inlier feature points in every pair of consecutive frames. In accordance with an embodiment, the control circuitry 202 may be further configured to overlay object information on the tracked object of interest in successive image frames of the sequence of image frames. As an example, the overlaid object information may include an object label and a bounding box that encloses a region occupied by the object of interest in the sequence of image frames.

Conventional object-tracking solutions may require the user to draw a bounding box around an object of interest by using a pointing device, such as the computer mouse. In contrast with the conventional solutions, the control circuitry 202 may be configured to select the object of interest for tracking based on only a single initialization point received as a user input from the user.

In other conventional solutions, to track the object of interest, a conventional object-tracking apparatus may segment an image region (which corresponds to the object of interest) from an image frame of the sequence of image frames. The conventional object-tracking apparatus may segment the image-region by use of various object segmentation techniques, such as saliency-based object segmentation or a pattern-based object segmentation. Segmentation of the object of interest by application of such object segmentation techniques may be computationally resource intensive and may not be suitable for tracking the object of interest in a live video. On the contrary, the control circuitry 202 may be configured to track the object of interest based on identification of inlier and outlier feature points in consecutive image frames of the sequence of image frames.

Figure 3A:
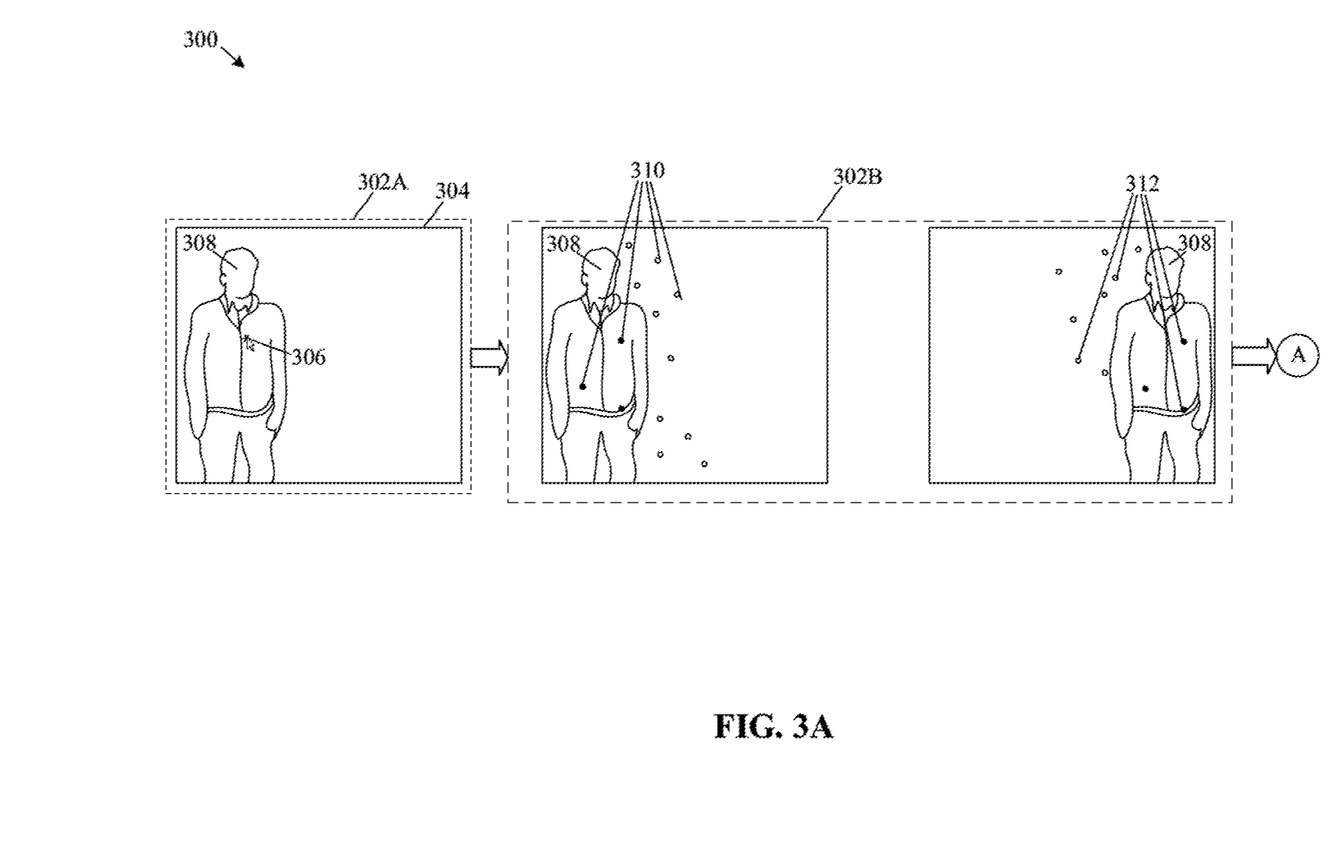
FIGS. 3A and 3B, collectively, illustrate a first exemplary scenario for implementation of the electronic device of FIG. 2, in accordance with an embodiment of the disclosure.
Figure 3B:
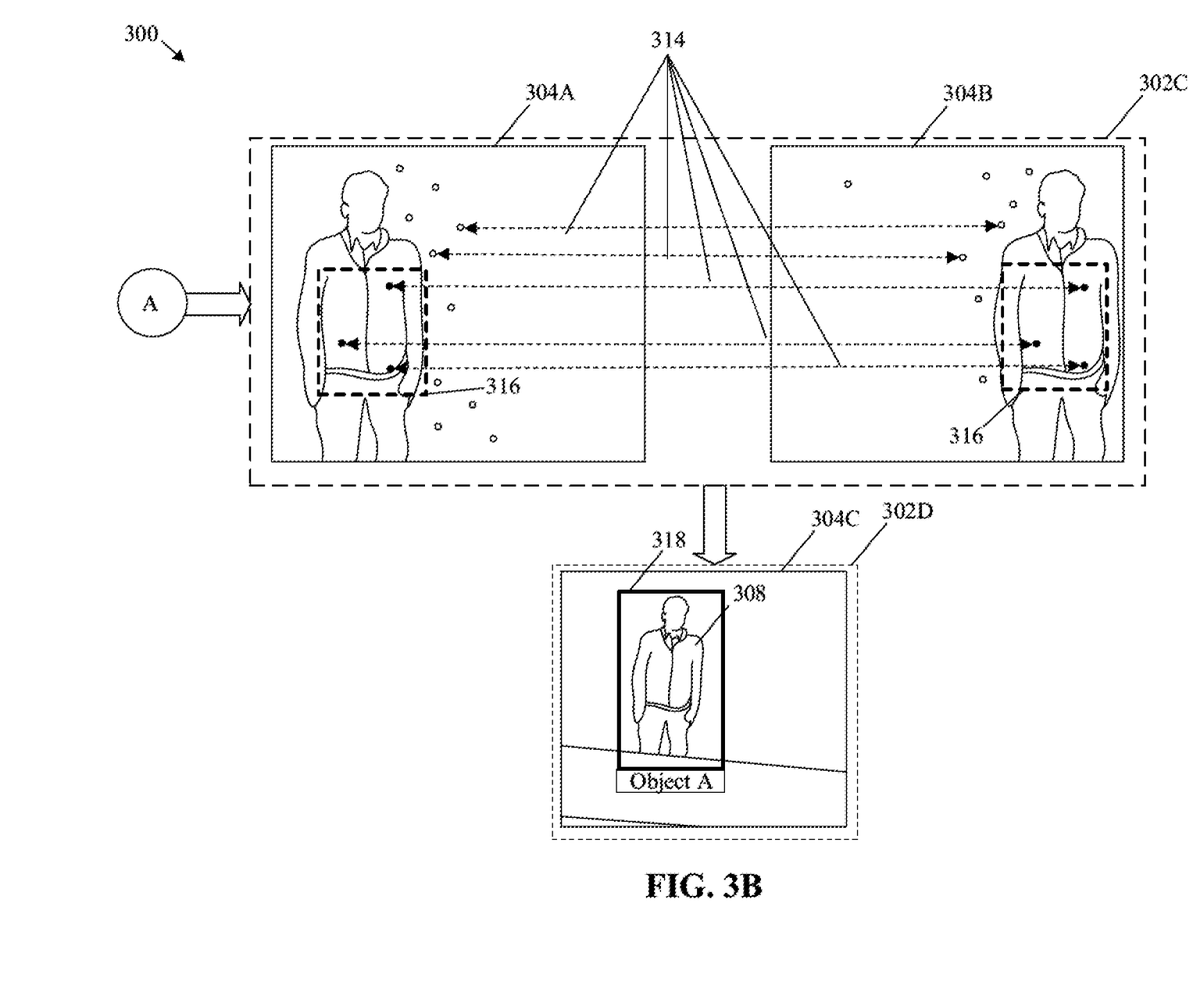

FIGS. 3A and 3B, collectively, illustrate a first exemplary scenario for implementation of the electronic device of FIG. 2, in accordance with an embodiment of the disclosure. FIGS. 3A and 3B are collectively explained in conjunction with elements from FIG. 1 and FIG. 2. The control circuitry 202 may be configured to capture a sequence of image frame by use of the image sensor 108 and further display the captured sequence of image frames on a display device to a user of the I/O device 206.

At 302A, a first input may be received on a first image frame 304A displayed on the display device. The first input may be received by the control circuitry 202 from the user, via the I/O device 206. The first input may correspond to an initialization point 306. The control circuitry 202 may be configured to select the initialization point 306 as a reference point for initialization of tracking operations for an object of interest 308 in the sequence of image frames. The initialization point 306 may be an inlier point on a region associated with the object of interest 308 in the first image frame 304A.

At 302B, a first set of feature points 310 and a second set of feature points 312 may be extracted from the first image frame 304A and a second image frame 304B, respectively. The control circuitry 202 may be configured to extract the first set of feature points 310 such that a distance of the first set of feature points 310 in the first image frame 304A from the initialization point 306 is less than or equal to a first threshold distance. Similarly, the control circuitry 202 may be configured to extract the second set of feature points 312 such that a distance of the second set of feature points 312 in the second image frame 304B from the initialization point 306 in the first image frame 304A is less than or equal to a second threshold distance. As an example, the first threshold distance may be "20 percent" of width of the first image frame 304A and the second threshold distance may be twice (or more, depending on the speed of the object of interest 308) the size of the first threshold distance, such as "40 percent" of the width of the first image frame 304A. The first threshold distance for the first image frame 304A may be different from the second threshold distance for the second image frame 304B.

At 302C, a set of feature correspondences (as indicated by dotted lines 314) may be estimated between the first set of feature points 310 and the second set of feature points 312. The control circuitry 202 may be configured to estimate the set of feature correspondences (i.e. correspondence data points or ordered pair of feature points) based on application of an image feature extraction technique, such as BRISK, SIFT, SURF, ORB (as mentioned in FIG. 1). The control circuitry 202 may be configured to estimate a plurality of inlier feature correspondences from the first image frame 304A and the second image frame 304B based on the RANSAC operation on the first set of feature points 310 and the second set of feature points 312. The details of the RANSAC operation has been described in detail, for example, in FIGS. 1 and 2. The control circuitry 202 may be configured to identify a plurality of inlier feature correspondences from the first image frame 304A and the second image frame 304B. The plurality of inlier feature correspondences may correspond to a set of inlier feature points (shown inside a dotted box 316) of the first image frame 304A and the second image frame 304B. The control circuitry 202 may be further configured to generate an optimal similarity matrix that fits on the set of inlier feature points and further track the object of interest 308 in the sequence of image frames, based on the optimal similarity matrix. In some embodiments, a path of the object of interest 308 may be tracked in successive frames based on update of positions of inlier feature points in every pair of consecutive frames.

At 302D, the control circuitry 202 may be configured to overlay object information on the tracked object of interest 308 in a successive image frame 304C of the sequence of image frames. As an example, the overlaid object information may include an object label (such as Object A) and a bounding box 318 that encloses a region occupied by the object of interest 308 in the sequence of image frames.

Figure 4A:
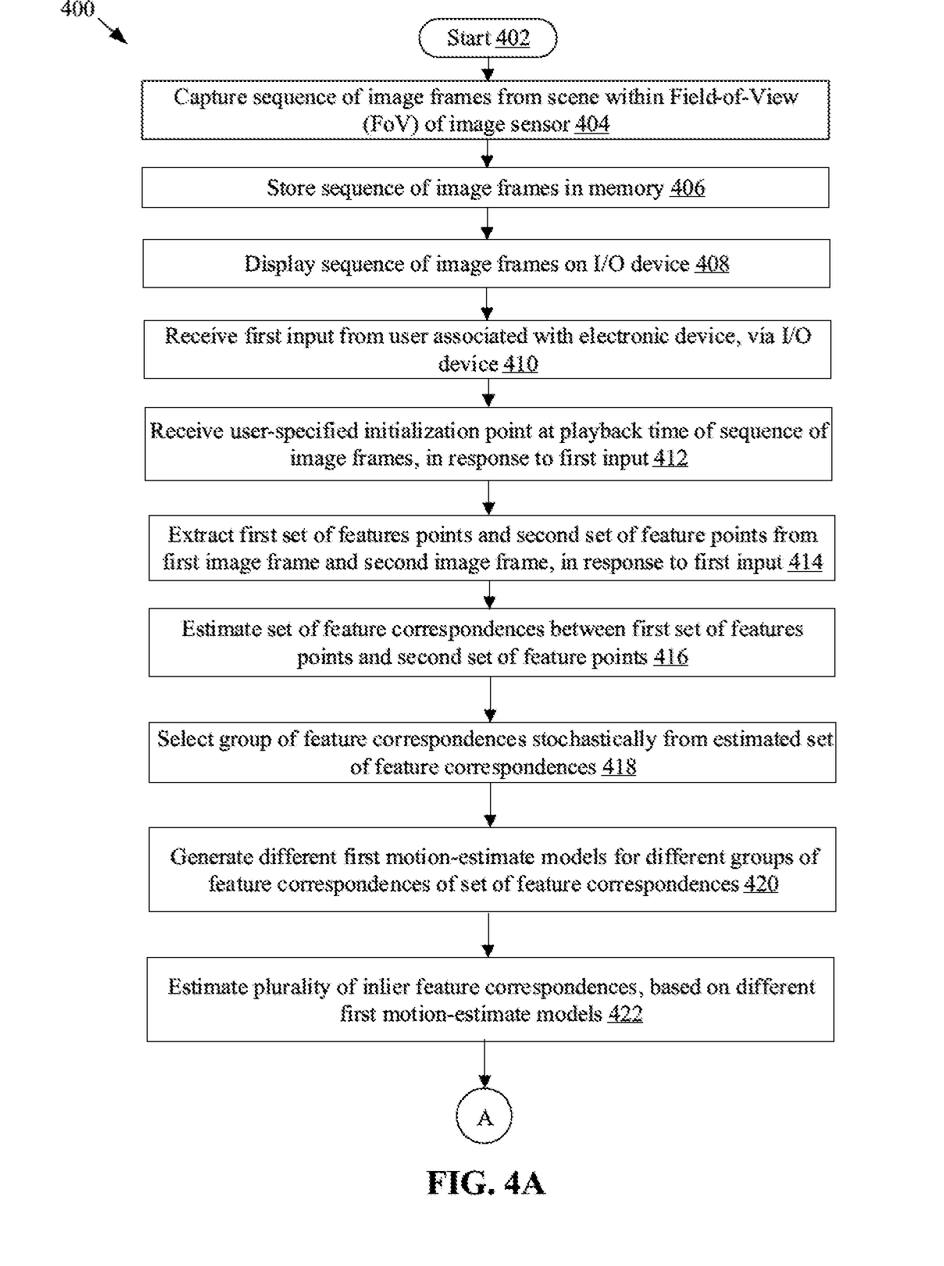
FIGS. 4A and 4B, collectively, depict a flowchart that illustrates an exemplary method for object tracking based on a user-specified initialization point, in accordance with an embodiment of the disclosure.
Figure 4B:
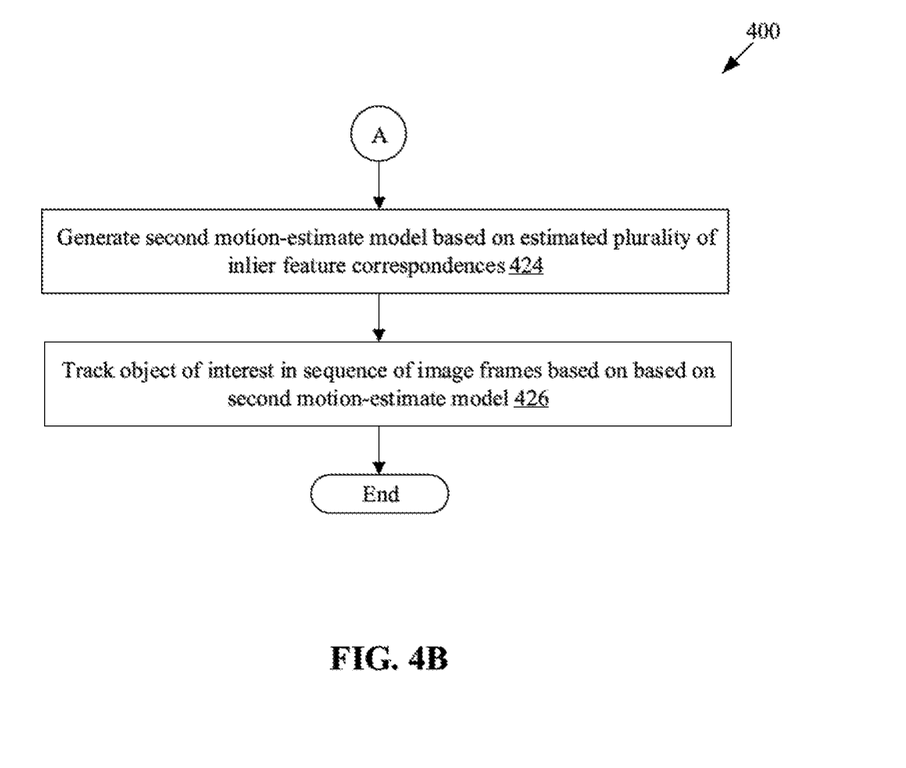

FIGS. 4A and 4B, collectively, depict a flowchart that illustrates an exemplary method for object tracking based on a user-specified initialization point, in accordance with an embodiment of the disclosure. With reference to FIGS. 4A and 4B, there is shown a flowchart 400. The flowchart 400 is described in conjunction with FIGS. 1, 2, 3A, and 3B. The method starts at 402 and proceeds to 404.

At 404, a sequence of image frames may be captured from a scene within a Field-of-View (FoV) of the image sensor 108. The image sensor 108 may be configured to capture the sequence of image frames from a scene within a Field-of-View (FoV) of the image sensor 108, as discussed in FIG. 1.

At 406, the sequence of image frames may be stored in the memory 204. As an example, the sequence of image frames 110 may include the first image frame 112A and the second image frame 112B. The control circuitry 202 may be configured to store the sequence of image frames may be stored in the memory 204.

At 408, the sequence of image frames may be displayed on the I/O device 206. The sequence of image frames 110 may be a live video, such as a closed circuitry television (CCTV) footage. The control circuitry 202 may be configured to display the sequence of image frames as a live preview on a display device, such as a smart television, a smartphone, a light emitting diode (LED screen) or a liquid crystal display (LCD) screen.

At 410, a first input may be received from the user associated with the electronic device 102, via the I/O device 206. The first input may correspond to position of the initialization point 116 in the first image frame 112A. The control circuitry 202 may be configured to receive the first input from the user associated with the electronic device 102, via the I/O device 206.

At 412, the user-specified initialization point may be received at a playback time of the sequence of image frames, in response to the first input. The user-specified initialization point may correspond to a position of the object of interest in a first image frame of the sequence of image frames. The control circuitry 202 may be configured to receive the user-specified initialization point at a playback time of the sequence of image frames, in response to the first input. The user-specified initialization point in the first image frame may be the initialization point for object tracking operations. The initialization point may be located in a first image region of the first image frame and represents the object-of interest in the first image frame.

At 414, a first set of features points and a second set of feature points may be extracted from the first image frame and the second image frame, in response to the first input. The first set of feature points and the second set of feature points may be present within a first threshold distance and a second threshold distance, respectively, from the user-specified initialization point. The control circuitry 202 may be configured to extract the first set of features points and the second set of feature points from the first image frame and the second image frame, in response to the first input.

At 416, a set of feature correspondences may be estimated between the first set of features points and the second set of feature points. The control circuitry 202 may be configured to estimate the set of feature correspondences between the first set of features points and the second set of feature points.

At 418, a group of feature correspondences may be selected stochastically from the estimated set of feature correspondences. The control circuitry 202 may be configured to select the group of feature correspondences stochastically from the estimated set of feature correspondences, as discussed in FIGS. 1 and 2. The selection of the group of feature correspondences may correspond to the selection of a group of feature points from the first set of feature points and the second set of feature points. Each group of feature correspondences from the different groups of feature correspondences may include two or more feature correspondences selected stochastically from the estimated set of feature correspondences.

At 420, different first motion-estimate models for different groups of feature correspondences of the set of feature correspondences may be generated. The control circuitry 202 may be configured to generate the different first motion-estimate models for different groups of feature correspondences of the set of feature correspondences. The different first motion-estimate models may represent a shift in position of the second set of feature points with respect to the first set of feature points in terms of the similarity transformation between the second set of feature points with respect to the first set of feature points. Each first motion-estimate model may be represented by a first similarity matrix. The first similarity matrix may be generated for each group of the different groups of feature correspondences.

At 422, a plurality of inlier feature correspondences may be estimated based on the different first motion-estimate models. The control circuitry 202 may be configured to estimate the plurality of inlier feature correspondences, based on the different first motion-estimate models, as discussed in FIGS. 1 and 2. The plurality of inlier feature correspondences may correspond to the object of interest in the first image frame and the second image frame.

At 424, a second motion-estimate model may be generated based on the estimated plurality of inlier feature correspondences. The second motion-estimate model may be an optimized motion-estimate model of the different first motion-estimate models. The control circuitry 202 may be configured to generate the second motion-estimate model based on the estimated plurality of inlier feature correspondences.

At 426, the object of interest may be tracked in the sequence of image frames based on the second motion-estimate model. The control circuitry 202 may be configured to track the object of interest in the sequence of image frames 110 based on based on the second motion-estimate model. Control passes to end.

Various embodiments of the disclosure may provide a non-transitory computer readable medium and/or storage medium, and/or a non-transitory machine readable medium and/or storage medium having stored thereon, a machine code and/or a set of instructions executable by a machine, such as the electronic device 102, and/or a computer. The set of instructions in the electronic device 102 may cause the machine and/or computer to perform the operations that includes storage of a sequence of image frames that includes a first image frame and a second image frame. The operations may further include estimation of a set of feature correspondences between a first set of features points in the first image frame and a second set of feature points in the second image frame. The first set of feature points may be present within a first threshold distance from a user-specified initialization point. The user-specified initialization point may correspond to an object of interest in the sequence of image frames. The operations may further include generation of different first motion-estimate models for different groups of feature correspondences of the estimated set of feature correspondences. The different first motion-estimate models may represent a shift in positions of the second set of feature points with respect to the first set of feature points in terms of a similarity transformation between the second set of feature points with respect to the first set of feature points. The operations may further include estimation, from the different groups of feature correspondences, of a plurality of inlier feature correspondences that correspond to the object of interest in the first image frame and the second image frame, based on the different first motion-estimate models. The operations may further include generation of a second motion-estimate model and further track the object of interest in the sequence of frames, based on the second motion-estimate model. The second motion-estimate model may be an optimized motion-estimate model of the different first motion-estimate models, generated based on the estimated plurality of inlier feature correspondences.

Various embodiments of the present disclosure may be found in an electronic device (such as the electronic device 102) for object tracking based on a user specified initialization point (such as the initialization point 116). The electronic device may include a memory (such as the memory 204) and control circuitry (such as the control circuitry 202). The memory may be configured to store a sequence of image frames that includes a first image frame (such as the first image frame 112A) and a second image frame (such as the second image frame 112B). The control circuit may be configured to estimate a set of feature correspondences between a first set of features points in the first image frame and a second set of feature points in the second image frame. The first set of feature points may be present within a first threshold distance from a user-specified initialization point. The user-specified initialization point may correspond to an object of interest in the sequence of image frames. The control circuitry may be further configured to generate different first motion-estimate models for different groups of feature correspondences of the estimated set of feature correspondences. The different first motion-estimate models may represent a shift in positions of the second set of feature points with respect to the first set of feature points in terms of a similarity transformation between the second set of feature points with respect to the first set of feature points. The control circuitry may be further configured to estimate, from the different groups of feature correspondences, a plurality of inlier feature correspondences that correspond to the object of interest in the first image frame and the second image frame, based on the different first motion-estimate models. The control circuitry may be further configured to generate a second motion-estimate model and further track the object of interest in the sequence of frames, based on the second motion-estimate model. The second motion-estimate model may be an optimized motion-estimate model of the different first motion-estimate models, generated based on the estimated plurality of inlier feature correspondences.

In accordance with an embodiment, the electronic device may further include an image sensor (such as the image sensor 108). The image sensor may be configured to capture a sequence of image frames of a scene within a Field-of-View (FoV) of the image sensor.

In accordance with an embodiment, the control circuitry may be further configured to receive the user-specified initialization point, at a playback time of the sequence of image frames, in response to a first input. The user-specified initialization point may correspond to a position of the object of interest in the first image frame of the sequence of image frames. The control circuitry may be further configured to extract the first set of features points from the first image frame and the second set of feature points from the second image frame, in response to the first input. The second set of feature points may be present within a second threshold distance from the user-specified initialization point.

In accordance with an embodiment, the control circuitry may be further configured to select a group of feature correspondences stochastically from the different groups of feature correspondences. The selection of the group of feature correspondences corresponds to a selection of a group of feature points from the first set of feature points and the second set of feature points. Each group of feature correspondences in the different groups of feature correspondences may include two or more feature correspondences selected stochastically from the estimated set of feature correspondences. In accordance with an embodiment, a number of feature correspondences in each group of feature correspondences may be selected based on a motion parameter associated with the object of interest. The motion parameter may be at least one of: a translation parameter, a rotation parameter, a shear parameter, a bend parameter, a deformation parameter, or a degrees of freedom associated with the object of interest.

In accordance with an embodiment, the control circuitry may be further configured to generate a first similarity matrix for each group of feature correspondences of the different groups of feature correspondences, wherein, for each group of feature correspondences, the first similarity matrix is a first motion-estimate model of the different first motion-estimate models.

In accordance with an embodiment, the control circuitry may be further configured to compute a score for each of the different first motion-estimate models based on application of a scoring model on a corresponding first motion-estimate model and a corresponding group of feature correspondences. The computation of the score may be done based on a proximity of a group of feature points for the corresponding motion-estimate model to the user-specified initialization point.

In accordance with an embodiment, the control circuitry may be further configured to estimate a set of inlier feature correspondences for each first motion-estimate model of the different first motion-estimate models. The set of inlier feature correspondences may be estimated based on comparison of a position estimation error for each first motion-estimate model of the different first motion-estimate models with a pixel-based threshold. The position estimation error for each first motion-estimate model of the different first motion-estimate models may corresponds to a deviation of a number of pixels by which an actual position deviates from an estimate position of each feature point in the first set of feature points and the second set of feature points. The control circuitry may be further configured to determine a maximum of the computed score for each of the different first motion-estimate models. The estimated plurality of inlier feature correspondences may be feature correspondences in the set of inlier feature correspondences for which the computed score is the maximum.

In accordance with an embodiment, the second motion-estimate model may be generated by application of a regression model on a set of inlier feature points in the estimated plurality of inlier feature correspondences.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. An electronic device, comprising:
a memory configured to store a sequence of image frames that comprises a first image frame and a second image frame; and
control circuitry configured to:
estimate a set of feature correspondences between a first set of features points in the first image frame and a second set of feature points in the second image frame,
wherein the first set of feature points is present within a first threshold distance from a user-specified initialization point that corresponds to an object of interest in the sequence of image frames;
generate different first motion-estimate models for different groups of feature correspondences of the estimated set of feature correspondences,
wherein the different first motion-estimate models represent a shift in positions of the second set of feature points with respect to the first set of feature points in terms of a similarity transformation between the second set of feature points with respect to the first set of feature points;
estimate, from the different groups of feature correspondences, a plurality of inlier feature correspondences that correspond to the object of interest in the first image frame and the second image frame, based on the different first motion-estimate models;
generate a second motion-estimate model that is an optimized motion-estimate model of the different first motion-estimate models, based on the estimated plurality of inlier feature correspondences; and
track the object of interest in the sequence of image frames, based on the second motion-estimate model.

2. The electronic device according to claim 1, further comprising an image sensor configured to capture a sequence of image frames of a scene within a Field-of-View (FoV) of the image sensor.

3. The electronic device according to claim 1, wherein the control circuitry is further configured to receive the user-specified initialization point, at a playback time of the sequence of image frames, in response to a first input, and
the user-specified initialization point corresponds to a position of the object of interest in the first image frame of the sequence of image frames.

4. The electronic device according to claim 3, wherein the control circuitry is further configured to extract the first set of features points from the first image frame and the second set of feature points from the second image frame, in response to the first input.

5. The electronic device according to claim 1, wherein the second set of feature points is present within a second threshold distance from the user-specified initialization point.

6. The electronic device according to claim 1, wherein the control circuitry is further configured to select a group of feature correspondences stochastically from the different groups of feature correspondences, and the selection of the group of feature correspondences corresponds to a selection of a group of feature points from the first set of feature points and the second set of feature points.

7. The electronic device according to claim 1, wherein each group of feature correspondences in the different groups of feature correspondences comprises two or more feature correspondences selected stochastically from the estimated set of feature correspondences.

8. The electronic device according to claim 7, wherein a number of feature correspondences in each group of feature correspondences is selected based on a motion parameter associated with the object of interest.

9. The electronic device according to claim 8, wherein the motion parameter is at least one of: a translation parameter, a rotation parameter, a shear parameter, a deformation parameter, or a degrees of freedom associated with the object of interest.

10. The electronic device according to claim 1, wherein the control circuitry is further configured to generate a first similarity matrix for each group of feature correspondences of the different groups of feature correspondences, and for each group of feature correspondences, the first similarity matrix corresponds to a first motion-estimate model of the different first motion-estimate models.

11. The electronic device according to claim 1, wherein the control circuitry is further configured to compute a score for each of the different first motion-estimate models based on application of a scoring model on a corresponding first motion-estimate model and a corresponding group of feature correspondences.

12. The electronic device according to claim 11, wherein the computation of the score is based on a proximity of a group of feature points for the corresponding first motion-estimate model to the user-specified initialization point.

13. The electronic device according to claim 11, wherein the control circuitry is further configured to estimate a set of inlier feature correspondences for each first motion-estimate model of the different first motion-estimate models, and
the set of inlier feature correspondences is estimated based on comparison of a position estimation error for each first motion-estimate model of the different first motion-estimate models with a pixel-based threshold.

14. The electronic device according to claim 13, wherein the position estimation error for each first motion-estimate model of the different first motion-estimate models corresponds to a deviation of a number of pixels by which an actual position deviates from an estimate position of each feature point in the first set of feature points and the second set of feature points.

15. The electronic device according to claim 13, wherein the control circuitry is further configured to
determine a maximum of the computed score for each of the different first motion-estimate models, and
the estimated plurality of inlier feature correspondences are feature correspondences in the set of inlier feature correspondences for which the computed score is the maximum.

16. The electronic device according to claim 1, wherein the second motion-estimate model is generated by application of a regression model on a set of inlier feature points in the estimated plurality of inlier feature correspondences.

17. A method, comprising:
in an electronic device:
estimating a set of feature correspondences between a first set of features points in a first image frame of a sequence of image frames and a second set of feature points in a second image frame of the sequence of image frames,
wherein the first set of feature points is present within a first threshold distance from a user-specified initialization point that corresponds to an object of interest in the sequence of image frames;

generating different first motion-estimate models for different groups of feature correspondences of the estimated set of feature correspondences,
wherein the different first motion-estimate models represent a shift in positions of the second set of feature points with respect to the first set of feature points in terms of a similarity transformation between the second set of feature points with respect to the first set of feature points;

estimating, from the different groups of feature correspondences, a plurality of inlier feature correspondences that correspond to the object of interest in the first image frame and the second image frame, based on the different first motion-estimate models;

generating a second motion-estimate model that is an optimized motion-estimate model of the different first motion-estimate models, based on the estimated plurality of inlier feature correspondences; and tracking the object of interest in the sequence of image frames, based on the second motion-estimate model.

18. The method according to claim 17, further comprising receiving the user-specified initialization point, at a playback time of the sequence of image frames, in response to a first input, wherein the user-specified initialization point corresponds to a position of the object of interest in the first image frame of the sequence of image frames.

19. The method according to claim 18, further comprising extracting the first set of features points from the first image frame and the second set of feature points from the second image frame, in response to the first input.

20. The method according to claim 17, wherein the second set of feature points is present within a second threshold distance from the user-specified initialization point.

* * * * *